Patented May 8, 1934

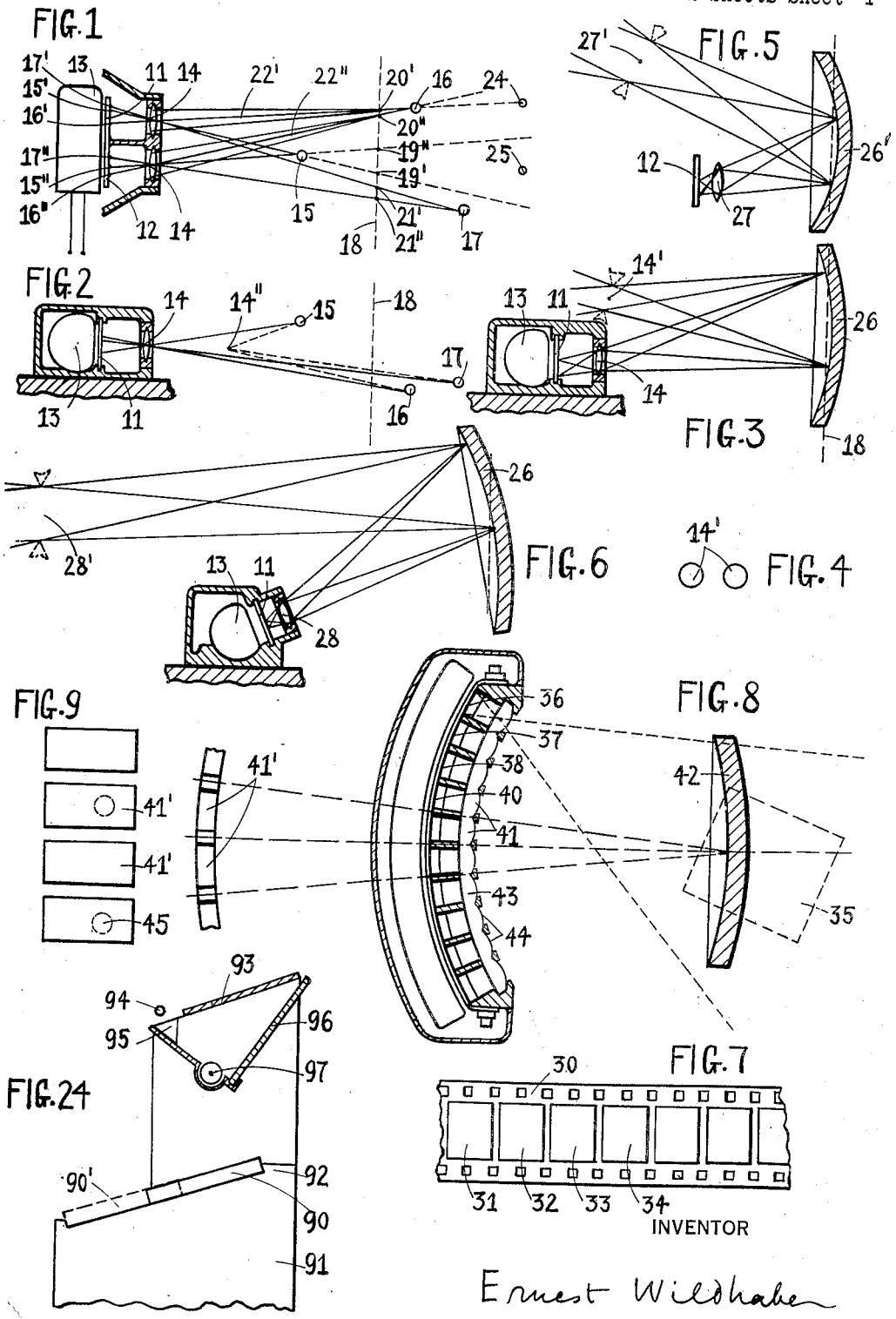

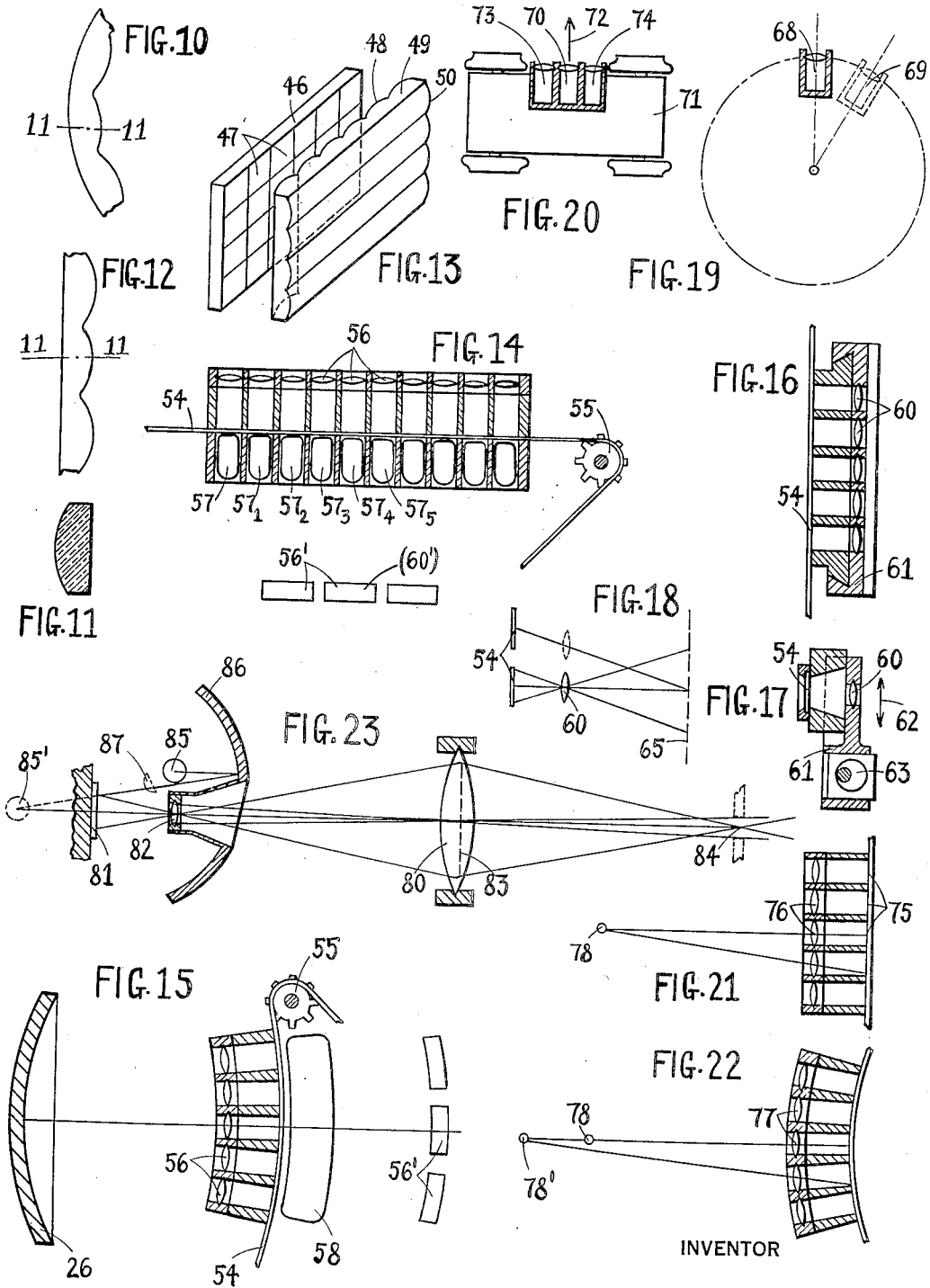

1,957,745

UNITED STATES PATENT OFFICE 1,957,745

METHOD AND APPARATUS FOR PROJECTING PICTURES

Ernest Wildhaber, Brooklyn, N. Y.

Application June 23, 1927, Serial No. 200,894

7 Claims. (Cl. 88—166)

The present invention relates to methods and apparatus for projecting pictures, stationary pictures as well as moving pictures, and particularly to effecting stereoscopic pictures, that is to say pictures appearing in relief.

Stereoscopic moving pictures, and other stereoscopic pictures projected to a screen hitherto necessitated the use of colored spectacles or other means disposed adjacent a spectator, such as revolving shutters, for confining vision of each eye to its corresponding picture. Each eye should namely see a somewhat different picture, as is well known, to cause stereoscopic sensation and to make the objects stand out in relief.

One object of the present invention is to do away with said means while nevertheless retaining stereoscopic vision.

Hitherto a spectator could see only extremely blurred pictures in stereoscopic projection, when not looking through the means provided, for instance when taking off the said spectacles.

An object of the present invention is to avoid this drawback. Pictures correctly projected in accordance with the invention will never appear blurred, when properly taken.

A further aim is to reduce the cost of stereoscopic projection, and to provide a novel form of stereoscopic film. Hitherto each picture of a stereoscopic film was suited to give an impression to one eye only. It is aimed here to provide a film, in which each picture is suited to give a correct impression successively to either eye.

Another aim of the present invention is to provide stereoscopic films suited for home projection. Further objects are the introduction of various novelties, such as stereoscopic news pictures and stereoscopic cartoons and caricatures.

Moreover a novel general method of projection is aimed at, which permits simultaneous projection of a plurality of pictures and which does not require extremely concentrated light. In addition a projection is looked for, which can be carried out also under indirect lighting.

A still other object is to provide a projection operating with a maximum economy of light.

Other aims will appear in the course of the specification and from recital of the appended claims.

In explaining my invention, reference is made to the accompanying drawings, in which Fig. 1 and Fig. 2 are a diagrammatic plan view and a corresponding front elevation, partly in section, of an incomplete device for simple stereoscopic projection, explanatory of the initial steps of my method.

Fig. 3 is an elevational view, largely a sectional view, of a device completing Fig. 2 in accordance with my invention.

Fig. 4 is a view of certain images formed in the arrangement of Fig. 3.

Fig. 5 is a diagrammatic view and section of an arrangement, illustrative of a procedure which is slightly modified as compared with the procedure illustrated in Fig. 3.

Fig. 6 is a diagrammatic view and section of another slightly modified arrangement.

Fig. 7 is a view of a picture strip.

Fig. 8 is a plan view, shown largely in section, of an arrangement such as may be used for obtaining living portraits appearing in relief, and which may be viewed from different angles.

Fig. 9 is a side view of elements of Fig. 8.

Fig. 10 and Fig. 12 are plan views of a plurality of lenses of novel character.

Fig. 11 is a section along lines 11—11 of either Fig. 10 or Fig. 12.

Fig. 13 is a perspective view of a picture surface containing individual pictures inside of the squares shown, and of a glass body placed in front of it, said glass body being ground to two systems of cylindrical surfaces.

Fig. 14 and Fig. 15 are diagrammatic plan views, shown largely in section, of two slightly modified devices for projecting a succession of pictures, such as moving pictures, in accordance with the present invention.

Fig. 16 and Fig. 17 are a plan view and a corresponding front elevational view, largely in section, of a device adapted to projecting moving pictures to a larger number of spectators.

Fig. 18 is a diagram explanatory of a modified motion of lens and film.

Fig. 19 is a diagrammatic plan view of a camera, performing exposures in different positions.

Fig. 20 is a diagrammatic plan view, partly a section, of cameras disposed on a carriage, for obtaining colored stereoscopic pictures in accordance with my invention.

Fig. 21 and Fig. 22 are diagrammatic sections illustrative of the discrepancy obtained, when photographing a scene in one way and reproducing it in another.

Fig. 23 is a sectional view illustrative of a modification of my invention, and also illustrating projection with indirect lighting.

Fig. 24 is a view, partly in section, of a table and device, such as may be used in forming stereoscopic drawings and cartoons.

The present invention will be first explained in its simplest embodiments. In Fig. 1 the numerals 11 and 12 denote two photographic pictures obtained with a double camera, as usual in stereoscopic work, and maintained in constant relation to each other. The pictures are supposed to be positive and transparent, and may for this reason be arranged on a film or on a glass plate. A source of uniform light is disposed back of the pictures, diagrammatically indicated at 13. A light suited for the present purposes can be obtained by forcing electric current between two electrodes of a glass container which contains a rarefied gas, that is to say gas having a pressure amounting to nearly vacuum. Light of this type is well known, for instance in advertising signs. Through the electric current the rarefied gas is made to glow and to emit a uniform light, which fills the glass container and is not confined to lines. With a container of this type disposed back of the pictures 11 and 12, the light will cover the whole picture surfaces uniformly and so, that every light point of the picture surfaces will emit light in all directions, namely to all points of the projection objective. The merits of this feature in connection with the present invention will be understood in the further course of the specification.

Lenses 14 are disposed in front of the pictures 11 and 12. Lenses 14 are preferably equal to the lenses of the double camera used in taking pictures 11 and 12, and they are moreover equally positioned as the lenses of said camera. Consequently the process used in obtaining the pictures 11 and 12 will be reversed, and the original objects will be reproduced, so to say, at their place before the said double camera. The nature of this reproduction will now be further explained.

In place of the objects I have shown three points 15, 16, 17. In photographing the pictures, the camera is focussed to a plane such as indicated in dotted lines at 18, and practically accurate images are obtained at 15', 16', 17' and at 15'', 16'', 17'' on the picture surface. In the reproduction, the accurate images of these points are on the plane 18, at 19', 20', 21' and 19'', 20'', 21'' respectively. Inasmuch as they are however not projected to a screen, but stand in the air, their location cannot be accurately established by an observer. They are placed there by narrow bundles of light, two of which are shown at 22' and 22'' by their limiting rays. These bundles are in usual practice much narrower than shown in the drawings, and so narrow that they can be considered as if they were single rays of light. The actual location of the reconstructed points 15, 16, 17 is obtained as the intersection of two corresponding rays (22', 22'') or bundles of light. The reproduction in relief is found to be as accurate, as the photography on a plane of the relieved original objects. It is well known that in usual photographic work high accuracy can be obtained also of such parts which are situated at a distance different from the one, to which the camera had been focussed, especially if the picture distance is much smaller than the distance of the objects from the lenses. Similarly the above said three dimensional reproduction can be made very accurate.

In the reproduction, as described so far, there is yet one fundamental deficiency: An observer located for instance at point 24 will not be able to see the points 15 and 17, for the rays or bundles of light which pass through the points 15 and 17, do not pass through point 24. Only bundle 22' can be seen at point 24. An observer located at point 25 would be still worse off. He could see nothing at all.

In accordance with the present invention means are provided so that at least one observer can see the entire picture in relief, without the use of glasses or other instruments.

One arrangement which fulfills this purpose is indicated in Fig. 3. The pictures are projected toward a concave mirror 26, which may be made substantially spherical, so that its surface constitutes accurately or approximately a part of a spherical surface of a radius about equal to its distance from lenses 14. Mirror 26 is positioned so as to have a distance from the lenses 14 about equal to the distance, to which the photographic camera had been focussed. In other words, the mirror 26 is disposed so that the reconstructed objects fall on the mirror, and in front as well as back of it. Plane 18 and mirror 26 have the same distances from the respective lenses.

Frequently pictures of very small size are taken, in which case it is not necessary to adjust the camera for focussing, a fixed setting being used in all cases. Mirror 26 is then preferably also set at a constant distance.

Mirror 26 does not alter the projected pictures to an appreciable extent, partly on account of its comparatively moderate curvature, and especially on account of its proximity to the projected pictures. It is well known, that a picture formed on the very surface of any type of mirror will have no other reflected picture than itself. In the present case the accurate pictures are situated in plane 18, which approximately coincides with the mirror surface.

While the projected pictures are not affected considerably by the mirror 26, an image of lenses 14 is formed at 14', at a distance suited for an observer. The location of the image can be determined with the known and usual means of optics. Inasmuch as the frame of the lenses 14 does not contain lighted parts, images 14 will reproduce the lenses only insofar, as they constitute an aperture or hole, through which all the projected rays pass. All the rays, which pass through a lens 14 (and which fall on mirror 26), are gathered again at its image 14'. Each point of a lens 14 receives light from all the points of the transparent picture disposed back of it; and correspondingly each point of the opening 14', which constitutes the image of a lens 14, receives light from all the points of the projected picture. If the eye of an observer is placed inside an aperture 14' it will see a complete image of a picture (11 or 12).

If the apertures provided at the lenses 14 are circular, circular images of said apertures will result, see Fig. 4.

An observer, who has his left eye inside of the left side area 14', Fig. 4, and his right eye inside of the right side area 14', will see the reproduced object in full relief.

The two areas 14' are therefore placed apart a distance, which preferably equals the average eye distance. If the picture is to be reproduced in full size, as so far described, and if the areas 14' are placed at the same distance from mirror 26, as compared with the lenses 14, as shown, the two lenses 14 should also be placed a distance apart which is equal to the average distance of the human eyes. Correspondingly the camera used in taking the pictures (11 and 12) should be fitted with equivalent lenses 14, which are disposed apart by said distance.

It is understood that the areas 14' are not the only places where the whole objects may be seen. The whole objects may be seen also from in front of said areas, and from in back of said areas, within distances which increase in proportion to the distance of areas 14 from a mirror 26 of given diameter. Areas 14' however constitute the largest areas, that is to say the areas which contain the largest number of points or surface elements, from which the whole of the reconstructed objects can be seen.

I may add a plurality of pairs of pictures (11, 12) to a strip and project simultaneously a plurality of picture pairs, so that several persons can be simultaneously served. Instead of a single pair of areas 14', several of such pairs will be provided. As many individual lenses 14 are then provided, as there are pictures to be projected, and projection is effected towards a common mirror 26, as described.

The pictures may also be projected to mirror 26 from a different distance, than the distance of the observers. The same pictures 11 and 12 may be projected in full size to mirror 26 from a smaller or larger distance, as indicated in Fig. 5 for a smaller distance, by providing a lens of increased or reduced curvature respectively, and by setting the picture at a distance from the optical center of the lens (27), which is proportionally reduced or enlarged. In order to maintain the same distance between observers and objects, as between the photographic camera and the objects, as is preferable in the case of full size reproduction, the mirror 26' is curved differently than the mirror 26 of Fig. 3, namely so that an image 27' of lens 27, is formed by said mirror at the desired distance.

The distance between adjacent pictures 11 and 12, and adjacent lenses 27 is reduced in proportion to the reduced distance from mirror 26, and is in the specific instance one half of the distance of the human eyes, so that the images 27' are apart by the full eye distance.

So far full size reproduction only has been dealt with, which is desirable in many cases, especially where the number of spectators is comparatively small. In other cases reproduction in enlarged or reduced size is desirable. Fig. 6 illustrates an enlarged reproduction. The pictures are projected to a mirror 26, which forms images at 28' of the lenses 28, and of their apertures, and from which the complete picture may be observed. According to Fig. 6 enlarged reproduction is obtained by providing lenses 28 of increased curvature, as compared with lenses 14, and by placing the images closer to the lenses 28, as described with reference to Fig. 5.

If so desired, the same enlarged images may be projected to a mirror (26) with lenses (14) such as had been used in photographing the pictures. The lenses are then placed the same increased distance from the mirror, as the observers.

Attention is paid not only to the adjustment of the human eyes with respect to each other, but also to providing natural adjustment of the individual eyes. This requirement has been substantially complied with, by setting the plane on which the individual images appear at about the average distance, at which the relieved bodies appear themselves. Further attention is paid to providing a natural perspective, to which the human eyes are found to be very sensitive. Care is taken that the objects are seen at the same angular width as they have been seen by the camera.

If in Fig. 6 the objects would be reproduced full size adjacent mirror 26 through lenses 14, which are equivalent to the lenses of the double camera referred to, then an observer looking through the projected apertures 28' would see the objects at a smaller angle than the camera which pictured them. The perspective would then not fit the distance of the observer. Different perspectives are seen from points placed at different distances, such as from lens 14, Fig. 2, and for instance point 14''. In order to see the objects under the same angles at which they have been photographed, the distance from the observer to the plane of the individual images should be equal to the distance of the lenses of the camera from the plane to which the camera had been focussed, if reproduction in full size is desired.

In case of enlarged size or reduced size reproduction, the distance of the observer, that is of apertures 28' from the plane of the individual images, should be enlarged or reduced in proportion.

The distance of the pair of lenses 14 of the photographic camera is preferably selected in general in the same proportion to the distance of the human eyes, as the distance of the camera from the average objects is to the distance of the observer from the reproduced objects.

A certain stereoscopic effect will however also be effected when providing different lens distances than explained above. When a smaller distance of the lenses is adopted, the pictures will still stand out in relief, but no more in full relief. An effect of half relief or reduced relief may thus be obtained.

A further peculiar and novel feature of my invention will now be described. Hitherto stereoscopic pictures have always been arranged in pairs. Each exposure was made double, one exposure for each eye. According to an embodiment of my invention, a number of stereoscopic pictures are so arranged on a strip 30, Fig. 7, that every two adjacent pictures form a stereoscopic pair together. In Fig. 7 the pictures are indicated diagrammatically with rectangles 31, 32, 33, 34. The pictures 31 and 32 form together a stereoscopic pair, picture 31 being suited to be viewed for instance with the left eye, and picture 32 being suited for the right eye. But the pictures 32, 33 and 33, 34 form also stereoscopic pairs with each other. In one pair picture 32 is viewed with the left eye and picture 33 with the right eye. In the other pair, picture 33 is viewed with the left eye and picture 34 with the right eye. Strips of this novel type have many applications, as will be further explained hereafter.

In one embodiment of my invention, a series of successive photographic pictures are taken at equal intervals, with the purpose of forming stereoscopic portraits or pictures, which may be viewed at various angles. An object 35, Fig. 8, may be photographed from different positions arranged in a circular arc whose hollow side faces the object. Views 36, 37, 38, 40 may thus be obtained, and projected with lenses 41 towards concave mirror 42, in the manner described with reference to the Figures 3, 5 and 6. Images of the apertures of the lenses 41 are formed at 41' by the concave mirror 42. Fig. 9 affords a front view of these images. They are of rectangular shape, and preferably closely adjacent, but not overlapping. They correspond to apertures at 41 of similar rectangular shape, which are similarly adjacent. Lenses 41 may be made higher than wide, to afford the indicated shape of apertures. Individual spherical lenses may be provided, if so desired, but it is generally cheaper to provide a joint ring of glass 43, containing on one side cylindrical lenses 44. Corresponding separate views of such glasses are shown in a larger scale in Fig. 10 and Fig. 11, the latter being a section along lines 11—11 of Fig. 10. The superposition of the two kinds of lenses produces the same effect as spherical lenses. If so desired further rows of pictures and of lenses may be disposed adjacent the shown row.

The shown rectangular shape of the apertures constitutes a preferred arrangement. The apertures could also be made circular, as explained with reference to Fig. 4.

The pictures, which reconstruct an original standing out in relief, can be conveniently viewed from places such as 41' and positions in front of and back of said places. The object may be photographed with a single camera, whose lens successively assumes the different positions of the different lenses 41. The camera swings around the object, or broadly moves before the object. If the object is entirely still, the displacement of the camera between successive exposures may be such, that adjacent parts 41', see Fig. 9, are arranged at a distance, which is a fraction of the eye distance. A number of parts 41' per eye distance are then provided. The eyes (45) of an observer look then through non adjacent parts 41', for instance through alternate parts.

Instead of placing images and lenses in a circle, they may also be arranged in a straight line. Here also two systems of cylindrical lenses may be provided instead of individual spherical lenses, for convenience in manufacturing. Figure 11 and Figure 12 illustrate the shape of the cylindrical lenses to take the place of three spherical lenses. The number has been made so small for effecting a large scale of the individual profiles.

The arrangement of two systems of cylindrical lenses is particularly advantageous, when a plurality of adjacent rows of lenses is provided. In Fig. 13 the surface 46 contains a number of individual pictures 47, each occupying one of the rectangles shown on surface 46. A lens is disposed in front of each picture. The effect of individual spherical lenses is obtained by grinding cylindrical surfaces 48 on one side of glass plate 49, and in grinding other cylindrical surfaces 50 on the other side of said plate. The cylindrical surfaces 48 and 50 extend at right angles to each other, and contain equal radii, but not necessarily equal width.

In projecting the pictures 47 through these lenses, care is taken that a picture is projected only through its own lens, and that it does not disturb the pictures formed through other lenses. This is effected by thin walls forming boxes, which are open at the front and at the rear, and where the lenses and the pictures are placed respectively. They are omitted in the drawings.

The pictures 47 are projected towards a concave mirror, as described with reference to Fig. 3 and Fig. 4, or to such other means as will be described hereafter.

In photographing an object, such as a person, from different positions, the object is not bound to be absolutely still, but may move to a certain limited extent. An observer who follows the pictures, that is to say who looks successively through the different apertures 41', will see then a moving or living object. This is of importance in portraits, and also in displayed advertising pictures.

Instead of necessitating observers, who move past an object, the pictures may be intermittently displaced, so that an observer obtains the same impression without moving himself. Motion pictures are hereby obtained, in which the spectator obtains the impression that he is continuously moving, and in which the objects move too. These motion pictures appear in relief, and are preferably made to appear in full relief.

One way of projection is indicated in Fig. 14, in which 54 denotes a picture film, which is intermittently fed over a toothed roll 55. Roll 55 receives intermittent motion in the conventional manner, and periodically displaces the film, so that the pictures are placed successively under the different lenses 56. Sources of uniform light 57 are disposed back of the pictures, and emit light in all directions from each point of their surface adjacent the pictures. Such lights have been described before. Images of the pictures are formed adjacent a concave mirror, which is not indicated in Fig. 14, and are seen from places inside of apertures 56', and from in front of said apertures and back of them. The apertures are the images of the apertures of the lenses 56, as formed by the said concave mirror.

Fig. 15 indicates a way of projecting from a film 54 disposed on a cylindrical surface, which is provided with suitable apertures back of the pictures, for giving passage to light coming from a source 58 of uniform light. Images of the pictures are formed by lenses 56 adjacent concave mirror 26, and are seen from places, which are the images of lenses 56.

The just described forms of motion picture projection are intended especially for projection to a limited number of spectators, such as for home projection.

For projection to a larger number of spectators, assembled in big theatres, means are provided for making the pictures visible from more places. Such means are indicated in the Figures 16 and 17. The film is periodically displaced as explained with reference to Fig. 14. The lenses 60 are however not stationary, but perform a reciprocating motion in a direction parallel to the axis of the feed roll (55) of the film. To this end, the lenses 60 are disposed on a slide 61, which is moved in direction 62, Fig. 17, by an eccentric 63, acting with a sliding block on a suitable slot of slide 61. Preferably the said motion of the lenses is performed once or twice per displacement of the film 54. Moreover the whole row of lenses 60 may be disposed on a number of slides, some of which move up, while the others move down. In this way it is possible to completely balance the mass effect, so that no vibration will be felt. The slides are furthermore made of a very light construction. The sources of light are omitted in Fig. 16 and Fig. 17.

The motion of the lenses is preferably made vertical. Through this motion, each image is made visible to all the persons which are located in a vertical plane, which passes through the mirror center and through the image (60') of the aperture, through which said image may be seen ordinarily. In other words, through the said motion the height of the areas 60' is increased many times. The length of the motion of the lenses is so chosen, that areas 60' extend to such height, that they reach even the highest placed spectators.

Through the motion of a lens in front of a stationary picture, the image of said picture, as formed by the lens, will be moved in proportion;

and, inasmuch as the image usually is much enlarged as compared with the picture of film 54, the motion of the image will not be as small as the motion of the lens, but many times larger. Care is therefore taken that a spectator can see a moving image only in one position. Frequently the height of an area 60' is small enough as to leave only one impression, in its rapid vertical path over an eye of a spectator. In cases where the normal height of the areas 60' is large enough to cause a slight blurring effect in vertical direction, the height of said areas is reduced to a suitable amount, by also reducing the height of the apertures of the lenses.

A very small height of the apertures may be provided especially when concentrating light to the moving apertures.

The vertical dimension of the mirror (26) is made sufficiently ample to cover the vertical path of the projected image.

Motion of the projected image may be entirely avoided, by moving not only the lenses (60) but also the film 54. In Fig. 18 film and lens are shown in central position in full lines, and in an offset position in dotted lines. Film and lens are moved in proportion to the respective distance from the individual projected image 65. The motions required in this case are however large. Moreover the reconstructed relieved objects change their positions somewhat during the motion of the areas 60', although the individual images are kept entirely stationary. Ordinarily the first said arrangement is therefore preferred.

In conventional motion pictures, the picture has a width or horizontal direction larger than the height or vertical direction, to insure a sufficiently wide field of vision. This arrangement is not necessary in the present case, because the pictures are taken with a moving camera, and the width of the field covered is therefore never too small. One is therefore more at liberty in the present case to take the pictures either in the conventional way, or standing up, that is to say with their larger sides vertical. Whenever one is not tied to conventional practice by the nature of the already existing means, the pictures are preferably provided with a height larger than the width, or with a width smaller than the height.

One important way of projection is obtained by projecting a picture first to one of the areas 56' or 60', and none to the adjacent areas. Then the same picture is projected to an adjacent area, while no picture is projected to the first said area. A spectator will then see a picture first with one eye, and then with the other eye, but not simultaneously with both eyes. After that a subsequent picture is successively projected to the two eyes, and so on.

A picture should be projected first to the right eye, when the spectator receives the impression to be moving to the right, and it should be first projected to the left eye, when the spectator believes to be moving to the left.

To obtain full stereoscopic relief, a spectator should have the impression of moving a distance equal to his eye distance per individual projection, that is to say in the interval during which a picture is shifted from one eye to the other. The spectator moves then virtually twice the eye distance in the time, in which subsequent pictures are projected to the same eye.

Correspondingly the camera preferably moves an amount twice the eye distance between adjacent exposures, if full size reproduction is aimed at; and a distance equal to the eye distance or to half the eye distance, if double or quadruple size reproduction is desired.

The motion of the camera, and the virtual motion of the spectator are not felt as a drawback in many applications, and in many cases are a direct asset. News pictures and travel pictures for instance may be conveniently made in this way. Moving picture cartoons or drawings can also readily be made in this manner, and reproduced in full relief, as will be further explained hereafter.

The described projection can be effected in a manner as will be described with reference to Fig. 14. In one position of the film the alternate sources of light 57, 57$_2$, 57$_4$ are lighted, while the intermediate lamps are dark. Then the lights 57, 57$_2$, 57$_4$ are switched off, and the intermediate lamps 57$_1$, 57$_3$, 57$_5$ are switched on, while the position of the film has not been changed. The lights are extinguished and the film is moved one picture. The first said lights 57, 57$_2$, 57$_4$ are again switched on, and the process continues in the way described.

Switching lights on and off in timed relation to the feed of the film, can be effected with known simple means, and does not require detailed explanation.

Another important way of projection is still simpler, and is frequently preferred, especially when the motion of the objects is not excessive. Pictures are simultaneously projected to adjacent areas 56', and two adjacent pictures are simultaneously seen with the two eyes, each eye viewing one picture. The film is moved in the conventional manner, light being either switched off or shut off otherwise, during the motion of the film. If several adjacent pictures are consecutively numbered, a spectator will see first the pictures 1, 2, then 2, 3, then 3, 4, and so on. Preferably all the pictures have been taken successively, each at a slightly different moment. It is evident that the virtual travel of the spectator per picture should be equal to his eye distance, when the objects are still; and also when the objects are moving themselves. Consequently in taking the photographs, the camera is preferably moved between adjacent exposures a distance equal to the average eye distance or half that distance respectively, when full size or double size reproduction is provided.

If the objects would be entirely still, mathematically accurate stereoscopic pairs would be formed by adjacent pictures. The individual motion of the objects intermediate successive exposures changes the stereoscopic pairs slightly, inasmuch as the two elements of the pairs are not simultaneously taken, and produces a slight stereoscopic distortion or displacement, which is the smaller, the faster the pictures have been taken, and which may be negligible ordinarily.

According to the present invention generally a series of pictures are provided, which furnish to a spectator an impression of virtual motion, and are projected broadly in such manner that a picture is seen by one eye before it is seen with the other eye.

It is not even necessary to take pictures with a continuously moving camera. A stereoscopic effect will also be obtained if the camera is stationary and the objects move continuously in one direction. Such cases occur for instance in processions, parades and in many other instances. Moving troups, moving ships, and moving trains also fall under this class. In such cases the background may appear somewhat flat, but the moving objects appear in actual relief, by projecting in accordance with the present invention. This projection is carried out in such manner, that an object moving from left to right is seen by the left eye, before it is seen by the right eye, and an object moving from right to left is first seen with the right eye.

Usually it is desirable to photograph pictures in the same general manner, in which they are reproduced. When the pictures are disposed in a circular arc during reproduction, they may also be photographed in such a manner, see Fig. 19, that the corresponding camera 68 assumes successively positions along a circular arc, one such position being shown in dotted lines at 69.

Fig. 19 diagrammatically illustrates a case where the camera is swung at a uniform rate about a pivot. The pivot may form part of a tripod which is transported together with the camera. In such cases the path of the camera in front of an object is limited, and for this reason the pictures may be taken sometimes for reproduction in half relief only, instead of in full relief. Reduced relief is obtained with a reduced rate of travel of the camera. The relief of the reproduced objects is obtained by the linear travel of the camera, and is not substantially affected by the angular motion. For this reason the camera is placed as large a distance from the pivot, as practically possible.

Fig. 20 refers to taking pictures while the camera moves in a substantially straight path. A camera 70 may be disposed on a rail car 71 or other car, shown in plan view, and pictures are then taken in a direction 72, which is perpendicular to the motion of the car. The distance between successive exposures is determined in the manner previously explained.

The present process is also well suited for forming colored moving pictures. It permits to make simultaneous exposures in different colors, such as in three colors. Three cameras 73, 70, 74 may be provided and placed side by side, as indicated. Each camera contains a suitable light filter, as known.

One way of procedure is the following. Each camera is supplied with an individual film, for exposure. Exposure takes place in each camera, as if no other cameras were present: The greater part of the time available is used for exposure, and the remainder for moving the film. A difference of phase is provided between the cameras. When the time elapsing between subsequent motions of the film of one camera is divided into three equal periods, then for instance the film is moved in the first camera in the whole or in part of the first period, while it stays stationary in the second and third periods. In the second camera, the film is stationary in the first and third periods, and is moved in the second period. In the third camera, the film remains stationary in the first and second periods, and is moved in the third period.

Exposures are therefore taken successively, but overlap each other. In reproduction, the pictures are arranged on a single film in the succession, in which they have been taken. The pictures are colored in their individual color, preferably by applying uniform color over the surface of a picture or over the side opposite to the photographic film. The film is then projected in a manner described, preferably by projecting adjacent pictures simultaneously to both eyes of spectators, and then periodically moving the film by one picture.

Instead of holding a film absolutely still in a camera, during exposure, a continuous small motion may be provided, which is about equal to the motion of the image of the principle objects in the camera. A very clear picture of such objects is then obtained. The film is intermittently moved in the conventional manner, but instead of being held still during exposure, it performs a slight feeding motion.

This procedure is also applicable to pictures in one color.

The intermittent feed motion of the film can be entirely done away with, and the film can be fed continuously at uniform speed by adopting a method such as described in my copending application Serial No. 199,317, filed June 16, 1927.

The diagrams Fig. 21 and Fig. 22 illustrate the slight differences encountered, when photographing pictures in one way and projecting them in a different way. When the pictures are photographed from a camera moving in a straight path, a series of pictures 75 (Fig. 21) are obtained, which could be accurately reproduced by a series of lenses 76. When the same film is actually reproduced from a curved path, as indicated in Fig. 22, the lenses 77 have larger distances from one another than lenses 76, and therefore project the pictures slightly differently. A point which should appear at 78, see Fig. 21, appears then at 78', Fig. 22. This difference may be avoided by placing the lenses 77 at distances equal to the pitch of the film, that is to say at the same distances as the film pictures, and as the lenses 76 of Fig. 21. Ordinarily however no correction needs to be provided Fig. 23 illustrates two features to be explained, namely the substitution of a lens (80) for the concave mirror of the embodiments so far explained, and a novel arrangement of indirect lighting. A picture 81 is provided on opaque or semi-opaque material, such as a metal strip, or paper. An image of picture 81 is formed by a lens 82 at 83 adjacent a lens 80. Image 83 can be seen from any point of area 84, which constitutes the image of the aperture of lens 82, as formed by lens 80. Instead of projecting to a concave mirror, projection is made to a lens, which, like the mirror it may substitute, does not need to be extremely accurate, because it affects the image proper only to a small extent. It serves to reconcentrate the diverging rays of light, which come from picture 81 and form image 83. Lenses (80) are frequently found suited for small size projection.

Picture 81 is lighted by a suitable source of light 85, which may in this case also be an electric lamp containing incandescent wires or threads. When the enlargement provided is considerable, or when an image is formed on a screen, and in other cases, it is found that indirect lighting produces dim images, as compared with light projected through a picture. In order to obtain well defined images also when the pictures projected are opaque, means are provided for gathering a considerable part of the rays of light reflected by picture 81. Reflected light is collected on lens 82, when projecting light in such manner to picture 81, that an image of the source of light would be formed on lens 82 by a reflecting plane surface, which coincides with the picture surface. Although paper for instance will not reflect light like a mirror, but diffuses it, it will nevertheless reflect a considerable part of the projected light in the same general direction as a mirror.

In the embodiment shown, a concave mirror 86 is provided, which forms an image 85' of light 85. It is understood that the image is formed at the shown place only, when not deflected or absorbed by some other body. The imaginary image 85' is located on the back of the picture surface directly opposite lens 82, and the same distance from the picture surface as said lens. A plane mirror, having a surface coinciding with the picture surface, would then deflect picture 85' in such manner, that it appears on lens 82. According to the above, the actual picture will also reflect light in the same general direction, so that a great part of the light projected to the picture surface, is also projected through the lens 82.

If so desired, a lens 87, shown in dotted lines, may be provided directly in front of light 85.

Through the procedures described and through other features to be explained hereafter, the present invention makes possible further novel types or classes of stereoscopic pictures.

In accordance with the present invention, it is intended to provide also stereoscopic pictures made from drawings, the drawings having been executed with any suitable means such as pens, brushes, pencils, pieces of chalk or the like. The drawings may be made in the manner to be described hereafter. Stereoscopic cartoons, either stationary ones or moving picture cartoons may be made, expressing humoristic or other scenes, caricatures, moods, in short anything which the human brain can conceive or wishes to exaggerate. Entirely novel effects are obtained hereby through the introduction of the third dimension. To see for instance lines of ink extending boldly through space, free from a drawing plane, conveys not only striking impressions, but also provides the artist with ample additional means of expression.

Cartoons for standard size moving pictures are preferably copied on transparent films. Moving picture cartoons in general are preferably so made, that in a row of pictures every two adjacent pictures are suited to form a stereoscopic pair, as has been explained with reference to photographed pictures. An impression of motion is then conveyed to a spectator.

Stationary cartoons are preferably also arranged in a row on a strip, in such manner that a plurality of stereoscopic pairs are formed. Frequently such cartoons are printed on paper, in one color or in a plurality of colors. They may then be projected with indirect lighting, such as described with reference to Fig. 23, if projection is desired.

Stereoscopic drawings or hand made plane pictures, of suitable large size, may be obtained by first executing one drawing in conventional manner. When stereoscopic pictures of single color are desired, that is to say when the objects are to appear only in black and white and possibly in intermediate shades, the first drawing is made in one color, and the second drawing of the pair is executed in another, complementary color by the artist. In executing the second drawing, it is important that its stereoscopic effect can be frequently or continuously checked. This is accomplished by looking through colored spectacles of opposite color. A picture to be seen for instance by the left eye, executed on light ground with one of said colors, will be seen as a dark or black picture through a glass of opposite color, whereas the right eye will not see the picture on account of its being executed on light ground in a color equal to the color of its glass. As a line is drawn on the second picture, it will combine with a corresponding line of the first picture, and constitute a line which assumes a position in space in correspondence with the shape and position of the line being drawn on the second picture. A completed pair of pictures may be brought to suitable size by photographing, and may then be printed black and white, either by photographic printing or by ordinary printing.

It is seen that the way described for obtaining stereoscopic pairs of single color is an adaptation of a well known kind of stereoscopic vision with complementary colors. This feature is here not used for projection, but for obtaining picture pairs through hand work.

Many further changes and modifications may be made in my invention without departing from its spirit. For definition of its scope I rely entirely on the annexed claims.

What I claim is:

1. The method of projecting pictures, which consists in forming an optical image of a picture with rays of light diverging towards said image, in reconcentrating said rays to make said image visible from a limited area, and in rendering said image successively visible from different areas.

2. The method of projecting pictures conveying the impression of motion in one general direction, projection being made from a picture record containing successively taken pictures of objects whereby said objects and the recording picture camera move relatively to each other in one general direction, which consists in simultaneously forming overlapping optical images of a plurality of said pictures with bundles of light passing through different points and diverging in a direction towards said images, in reconcentrating and confining the rays of said bundles to different areas respectively for rendering said images visible exclusively from said areas, and in rendering an image visible successively from all said areas, visibility of said image moving in the same direction as the objects pictured in said images appear to move.

3. The method of projecting pictures, which consists in providing a picture strip, in simultaneously forming overlapping images of a plurality of pictures of said strip, in making said images visible from a plurality of separate areas in a manner that each of said images is visible from only one of said areas, and in making the images of each of said pictures successively visible from all said areas.

4. In a device for projecting pictures, a plurality of adjacent projection objectives for simultaneously projecting pictures, means for holding a picture carrier adjacent said objectives, said picture carrier containing a plurality of pictures arranged in a row, means for concentrating light while avoiding diffusion in at least one direction, said objectives and picture carrier being disposed to form overlapping images of said pictures substantially on said last named means, a source of light disposed to throw light through said pictures and said objectives, and means for displacing said picture carrier and said objectives relatively to each other in the direction of said row, for successively projecting each of said pictures through said plurality of objectives.

5. In a device for projecting pictures, a plurality of adjacent projection objectives for simultaneously projecting pictures, means for holding a picture strip adjacent said objectives, said picture strip containing a plurality of pictures arranged in a row, means for concentrating light while avoiding diffusion in at least one direction, said objectives facing towards said last named means and being positioned to form overlapping images of said pictures substantially on said last named means, a source of light disposed to throw light through said pictures and said objectives, and means for feeding said strip past said objectives in the direction of said row, for successively projecting each of said pictures through said plurality of objectives.

6. The method of projecting pictures, which consists in providing pictures disposed on a strip, said pictures conveying the impression of motion in one general direction, in displacing said pictures, in forming an image of each picture first in one position of said picture and then in another position, and in concentrating the image corresponding to said one position to one eye and the successive image corresponding to said other position to the other eye of an observer.

7. The method of projecting pictures, which consists in providing pictures disposed on a strip, said pictures conveying the impression of motion in one general direction, in forming images of said pictures, and in presenting the image of each picture first to one eye and then to the other eye of an observer.

ERNEST WILDHABER.